(12) United States Patent
Ningappa et al.

(10) Patent No.: US 12,399,806 B2
(45) Date of Patent: *Aug. 26, 2025

(54) TEST CYCLE TIME REDUCTION AND OPTIMIZATION

(71) Applicant: Harness Inc., San Francisco, CA (US)

(72) Inventors: Shivakumar Ningappa, Milpitas, CA (US); Uri Scheiner, Pleasanton, CA (US); Srinivas Bandi Ramesh Babu, Los Altos, CA (US); Srinivasa Rao Gurubelli, Fremont, CA (US)

(73) Assignee: Harenss Inc., San Francisco, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 17/371,127

(22) Filed: Jul. 9, 2021

(65) Prior Publication Data
US 2021/0334196 A1 Oct. 28, 2021

Related U.S. Application Data

(63) Continuation-in-part of application No. 16/831,811, filed on Mar. 27, 2020.

(51) Int. Cl.
*G06F 11/36* (2025.01)
*G06F 11/3668* (2025.01)

(52) U.S. Cl.
CPC ...... *G06F 11/3688* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 6,011,918 A * | 1/2000 | Cohen | G06F 9/465 |
| | | | 719/330 |
| 9,514,034 B1 * | 12/2016 | Griffin | G06F 11/3688 |
| 9,569,341 B1 * | 2/2017 | van Schaik | G06F 11/3688 |
| 11,163,674 B1 * | 11/2021 | Campos Perez | G06F 11/3684 |
| 11,837,367 B1 * | 12/2023 | Bower | G16H 40/63 |
| 2002/0184486 A1 * | 12/2002 | Kershenbaum | G06F 9/468 |
| | | | 713/150 |
| 2004/0019669 A1 * | 1/2004 | Viswanath | H04L 43/50 |
| | | | 709/221 |
| 2013/0103986 A1 * | 4/2013 | Yan | G06F 11/3672 |
| | | | 714/E11.178 |
| 2015/0095619 A1 * | 4/2015 | Dubey | G06F 11/3688 |
| | | | 712/216 |
| 2017/0116106 A1 * | 4/2017 | Bakowski | G06F 11/368 |
| 2019/0294531 A1 * | 9/2019 | Avisror | G06F 11/3692 |
| 2021/0209010 A1 * | 7/2021 | Durairaj | G06F 8/70 |
| 2021/0349811 A1 * | 11/2021 | Quemy | G06F 11/3684 |
| 2022/0391311 A1 * | 12/2022 | Zhang | G06F 8/70 |

* cited by examiner

*Primary Examiner* — Philip Wang

(57) ABSTRACT

A system that automatically reduces test cycle time to save resources and developer time. The present system selects a subset of tests from a full test plan that should be selected for a particular test cycle, rather than running the entire test plan. The subset of tests is intelligently selected using metrics such as tests associated with changed code and new and modified tests.

20 Claims, 11 Drawing Sheets

800

| METHOD | TEST |
|---|---|
| M1 | T1, T2 |
| M2 | T3 |
| M3 | T4 |
| M4 | T5, T6, T7 |
| M5 | T8, T9 |
| M6 | T10 |
| M7 | T10, T11 |
| M8 | T12 |
| M9 | T13, T14 |
| M10 | T15 |
| M11 | T16, T17 |
| M12 | T18 |
| M13 | T19, T20 |
| M14 | T21, T22 |
| M15 | T23 |
| M16 | T24, T25 |
| M17 | T26 |
| M18 | T27 |

900

| METHOD | TEST |
|--------|------|
|  |  |
| M2 | T3 |
| M3 | T4 |
| M4 | T5, T6, T7 |
|  |  |
|  |  |
|  |  |
|  |  |
|  |  |
| M11 | T16, T17 |
| M12 | T18 |
| M13 | T19, T20 |
|  |  |
|  |  |
|  |  |
| M17 | T26 |
| M18 | T27 |

TEST CYCLE TIME REDUCTION AND OPTIMIZATION

BACKGROUND

Continuous integration of software involves integrating working copies of software into mainline software, in some cases several times a day. Before integrating the working copy of software, the working copy must be tested to ensure it operates as intended. Testing working copies of software can be time consuming, especially when following typical testing protocols which require executing an entire test plan every test cycle. An entire test plan often takes hours to complete, which wastes computing resources and developer time.

SUMMARY

The present technology, roughly described, automatically reduces test cycle time to save resources and developer time. The present system selects a subset of tests from a full test plan that should be selected for a particular test cycle, rather than running the entire test plan. The subset of tests is intelligently selected using metrics such as tests associated with changed code and new and modified tests.

In operation, a test agent will operate in a testing environment and communicates with an intelligence server. When a test within the testing environment is about to execute, the test agent communicates with the intelligence server by providing the build number, commit-id, and other information, for example in one or more files sent by the test agent to the intelligence server. The intelligence server receives the information, processes the information using a call graph, and provides a list of tests to be executed to the test agent. The test agent executes the test list provided by the intelligence server. After test completion, the test agent parses the test results and uploads the tests and along with a newly generated call-graph. As a result, the test cycle is shorter with fewer tests being executed.

In some instances, the present technology automatically tests software code by first detecting a test event initiated by a testing program and associated with testing a first software at a testing server. The test event can be detected by an agent executing within the testing program at the testing server. The testing event can be associated with a plurality of tests for the first software. Next, the agent can transmit, from the testing server to a remote server, one or more files associated with a subset of the first software to be tested. The agent on the testing server can receive, from the remote server, a list of tests to be performed in response to the test event. The received list of tests can be a subset of the plurality of tests and generated at least in part from a first call graph. The tests in the list of tests can be executed by the agent in the testing server.

In some instances, a non-transitory computer readable storage medium includes embodied thereon a program, the program being executable by a processor to perform a method for automatically testing software code. The method may begin with detecting a test event initiated by a testing program and associated with testing a first software at a testing server, wherein the test event is detected by an agent executing within the testing program at the testing server, and the testing event is associated with a plurality of tests for the first software. The method continues with transmitting, by the agent on the testing server to a remote server, one or more files associated with a subset of the first software to be tested. The agent on the testing server can receive, from the remote server, a list of tests to be performed in response to the test event, wherein the received list of tests being a subset of the plurality of tests and generated at least in part from a first call graph. The method also includes executing the tests in the list of tests by the agent in the testing server.

In some instances, a system for automatically testing software code includes a server having a memory and a processor. One or more modules can be stored in the memory and executed by the processor to detect a test event initiated by a testing program and associated with testing a first software at a testing server, the test event detected by an agent executing within the testing program at the testing server, the testing event associated with a plurality of tests for the first software, transmit, by the agent on the testing server to a remote server, one or more files associated with a subset of the first software to be tested, receive, by the agent on the testing server from the remote server, a list of tests to be performed in response to the test event, the received list of tests being a subset of the plurality of tests and generated at least in part from a first call graph, and execute the tests in the list of tests by the agent in the testing server.

In some instances, software code is tested by receiving, by a remote server, a message from an agent executing within a testing program at a testing server, wherein the message including one or more files associated with a test event initiated at the testing server, and wherein the test event associated with a first software to be tested at the testing server. The method further includes parsing the one or more files by the remote server to identify portions of the first software to test. The method continues with identifying a plurality of tests to perform by the testing server based on the first software portions and a call graph. The method also includes transmitting, by the remote server, the plurality of tests to perform at the testing server.

In some instances, a non-transitory computer readable storage medium includes embodied thereon a program, wherein the program is executable by a processor to perform a method for automatically testing software code. The method can begin by receiving, by a remote server, a message from an agent executing within a testing program at a testing server. The message can include one or more files associated with a test event initiated at the testing server, wherein the test event associated with a first software to be tested at the testing server. The method further includes parsing the one or more files by the remote server to identify portions of the first software to test. The method continues with identifying a plurality of tests to perform by the testing server based on the first software portions and a call graph. The method also includes transmitting, by the remote server, the plurality of tests to perform at the testing server.

In some instances, a system for automatically testing software code includes a server including a memory and a processor, and one or more modules stored in the memory. The one or more modules can be executed by the processor to receive, by a remote server, a message from an agent executing within a testing program at a testing server, the message including one or more files associated with a test event initiated at the testing server, the test event associated with a first software to be tested at the testing server, parse the one or more files by the remote server to identify portions of the first software to test, identify a plurality of tests to perform by the testing server based on the first software portions and a call graph, and transmit by the remote server, the plurality of tests to perform at the testing server.

DETAILED DESCRIPTION

The present technology automatically reduces test cycle time to save resources and developer time. The present system selects a subset of tests from a full test plan that should be selected for a particular test cycle, rather than running the entire test plan. The subset of tests is intelligently selected using metrics such as tests associated with changed code and new and modified tests.

In operation, a test agent will operate in a testing environment and communicates with an intelligence server. When a test within the testing environment is about to execute, the test agent communicates with the intelligence server by providing the build number, commit-id, and other information, for example in one or more files sent by the test agent to the intelligence server. The intelligence server receives the information, processes the information using a call graph, and provides a list of tests to be executed to the test agent. The test agent executes the test list provided by the intelligence server. After test completion, the test agent parses the test results and uploads the tests and along with a newly generated call-graph. As a result, the test cycle is shorter with fewer tests being executed.

The present system addresses a technical problem of efficiently testing portions of software to be integrated into a main software system used by customers. Currently, when a portion of software is to be integrated into a main software system, a test plan is executed to test the entire test portion. The entire test plan includes many tests and takes a long time to complete, often hours, and takes up large amounts of processing and memory resources, as well as time.

The present system provides a technical solution to the technical problem of efficiently testing software by intelligently selecting a subset of tests from a test plan and executing the subset. The present system identifies portions of a system that have changed or for which a test has been changed or added, and adds the identified tests to a test list. An agent within the test environment then executes the identified tests. The portions of the system can be method classes, allowing for a very precise list of tests identified for execution.

Figure 1:
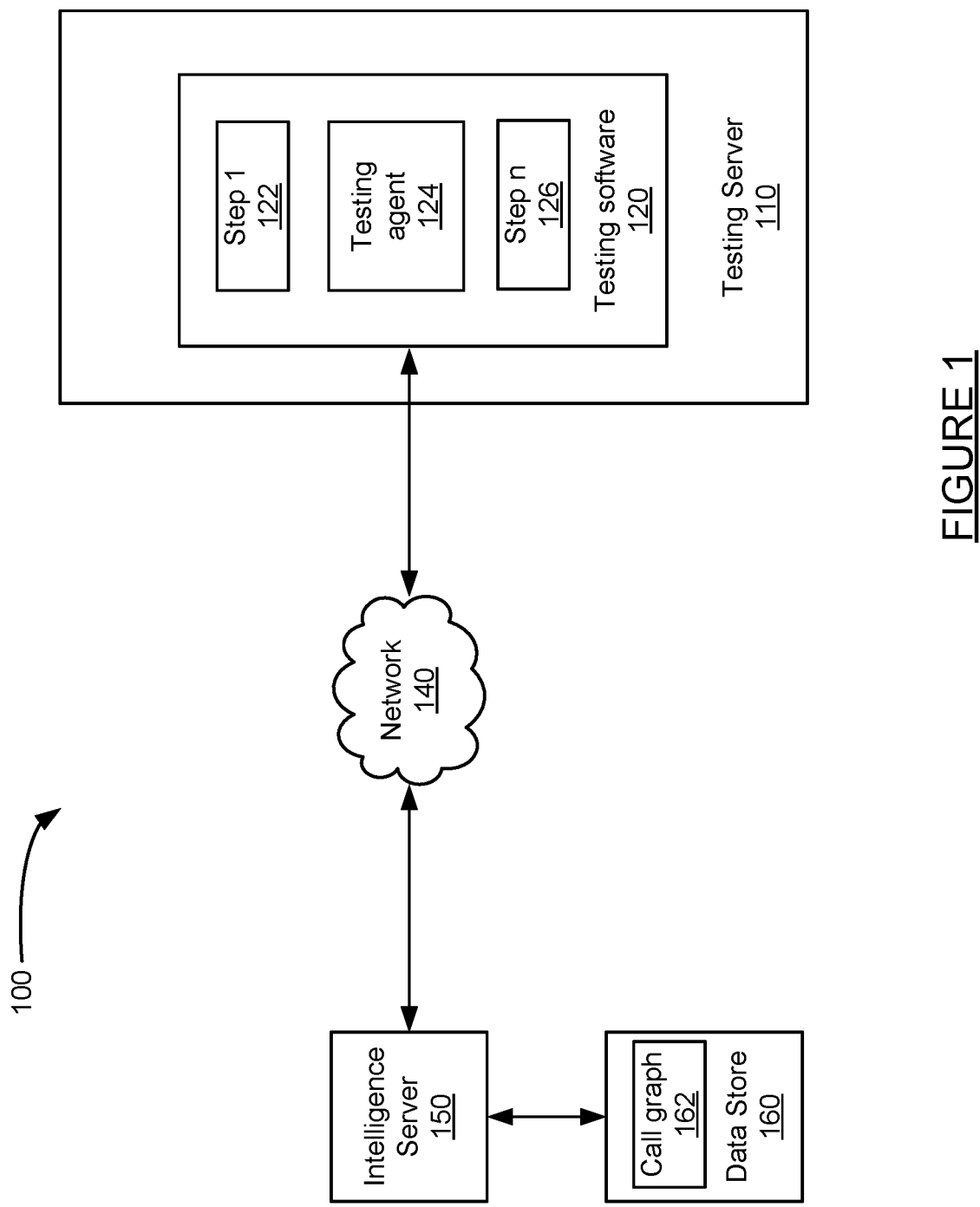
FIG. 1 is a block diagram of a system for testing software.

FIG. 1 is a block diagram of a system for testing software. System 100 of FIG. 1 testing server 110, network 140, intelligence server 150, and data store 160. Testing server 110, intelligence server 150, data store 160, may all communicate directly or indirectly with each other over network 140.

Network 140 may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks.

Testing server 110 may include testing software 120. Testing software 120 tests software that is under development. The testing software can test the software under development in steps. For example, the testing software may test a first portion of the software using a first step 122, and so on with additional steps through an nth step 126.

A testing agent 124 may execute within or in communication with the testing software 120. The testing agent may control testing for a particular stage or type of testing for the software being developed. In some instances, the testing agent may detect the start of the particular testing, and initiate a process to identify which tests of a test plan to execute in place of every test in the test plan. Testing agent 124 is discussed in more detail with respect to FIG. 2.

Intelligence server 150 may communicate with testing server 110 and data store 160, and may access a call graph stored in data store 160. Intelligence server 150 may identify a subgroup of tests for testing agent 124 to execute, providing for a more efficient testing experience at testing server 110. Intelligence server 150 is discussed in more detail with respect to FIG. 3.

Data store 160 may store a call graph 162 and may process queries for the call graph. The queries main include storing a call graph, retrieving call graph, updating portions of a call graph, retrieving data within the call graph, and other queries.

Figure 2:
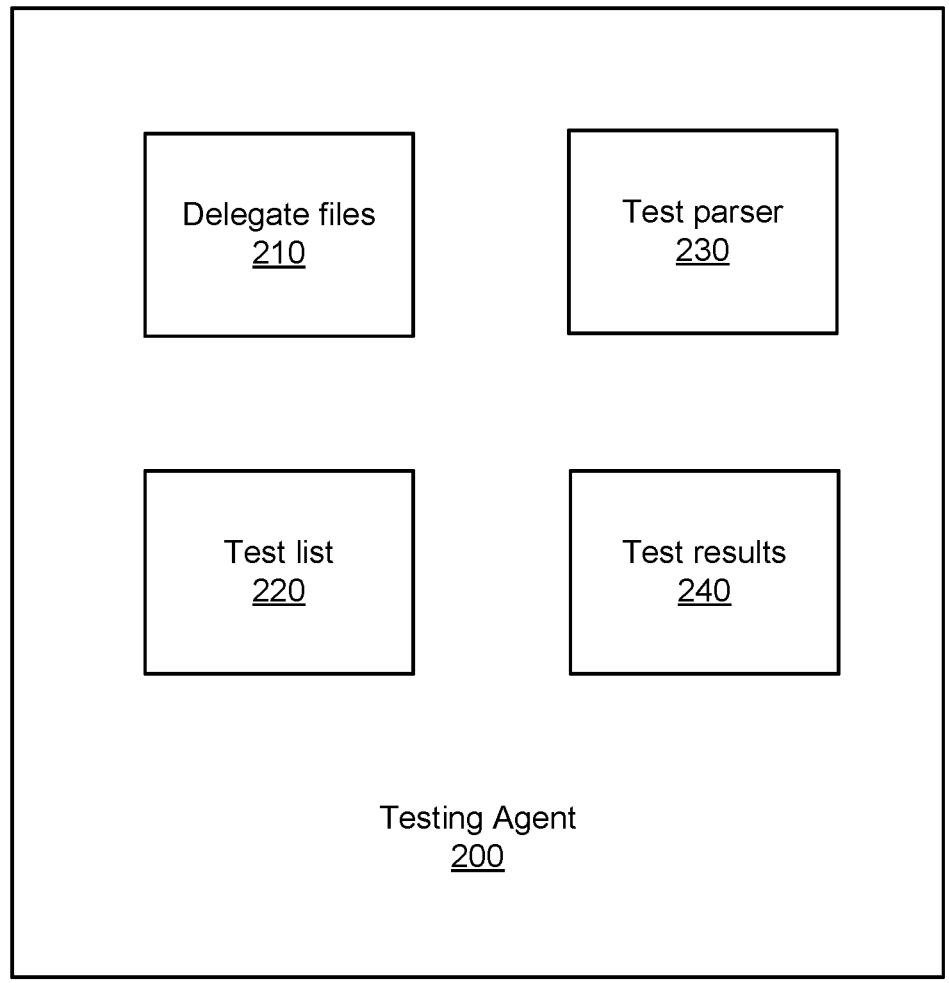
FIG. 2 is a block diagram of a testing agent.

FIG. 2 is a block diagram of a testing agent. Testing agent 200 of FIG. 2 provides more detail of testing agent 120 of FIG. 1. Testing agent 200 includes delegate files 210, test list 220, test parser 230, and test results 240. Delegate files include files indicating what parts of a software under test have been updated or modified. These files can eventually be used to generate a subgroup of tests to perform on the software. Test list 220 is a list of tests to perform on the software being tested. The test list 220 may be retrieved from intelligence server 150 in response to providing the delegate files to the intelligence server. A test parser 230 parses files that have been tested to identify the methods and other data for each file. Test results 240 provide the results of a particular tests to indicate the test status, results, and other information.

Figure 3:
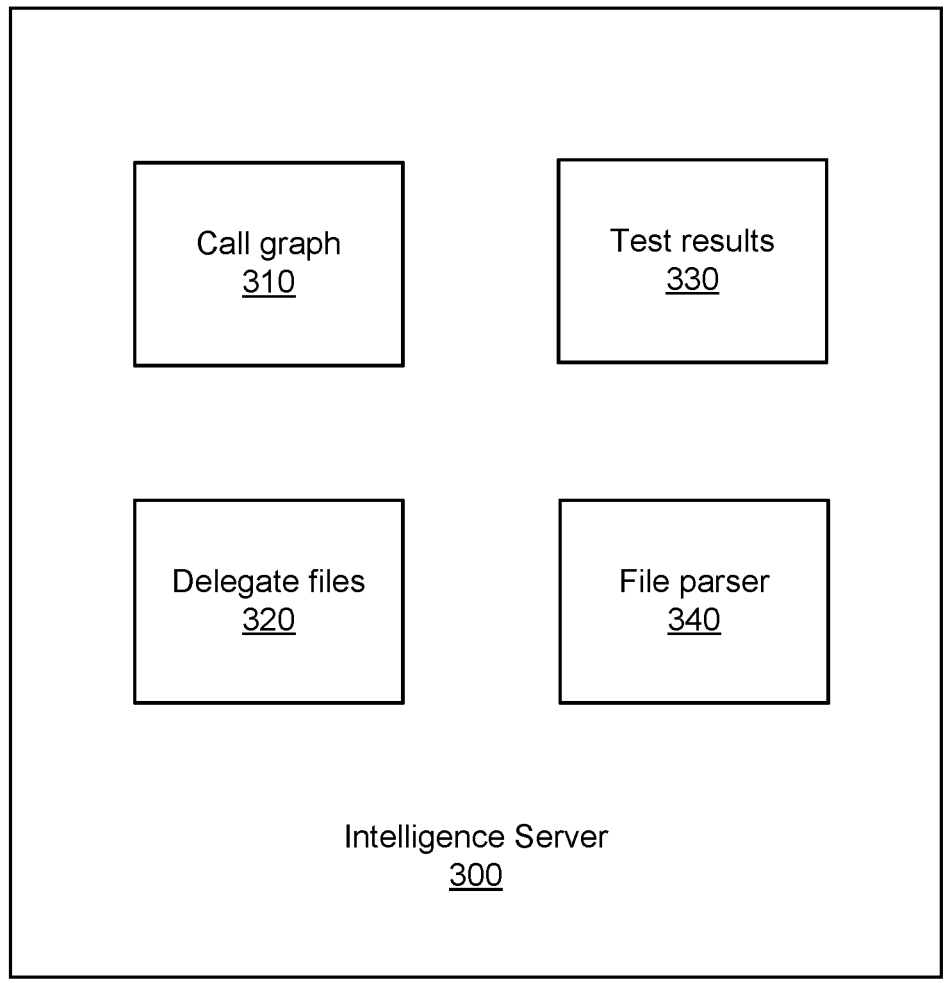
FIG. 3 is a block diagram of an intelligence server.

FIG. 3 is a block diagram of an intelligence server. Intelligence server 300 of FIG. 3 provides more detail for intelligence server 150 of the system of FIG. 1. Intelligence server 300 includes call graph 310, delegate files 320, test results 330, and file parser 340. Call graph 310 is a graph having relationships between methods of the software under development, and subject to testing, and the tests to perform for each method. A call graph can be retrieved from the data store by the intelligence server. Delegate files are files are files within information regarding methods of interest in the software to be tested. Methods of interest include methods which have been changed, methods that have been added, and other methods. Files can be received from the testing agent from the testing server. Test results 330 indicate the results of a particular set of tests. The test results can be received from a remote testing agent that is perform the tests. File parser 340 parses one or more delegate files received from a remote testing agent in order to determine which methods need to be tested.

Figure 4A:
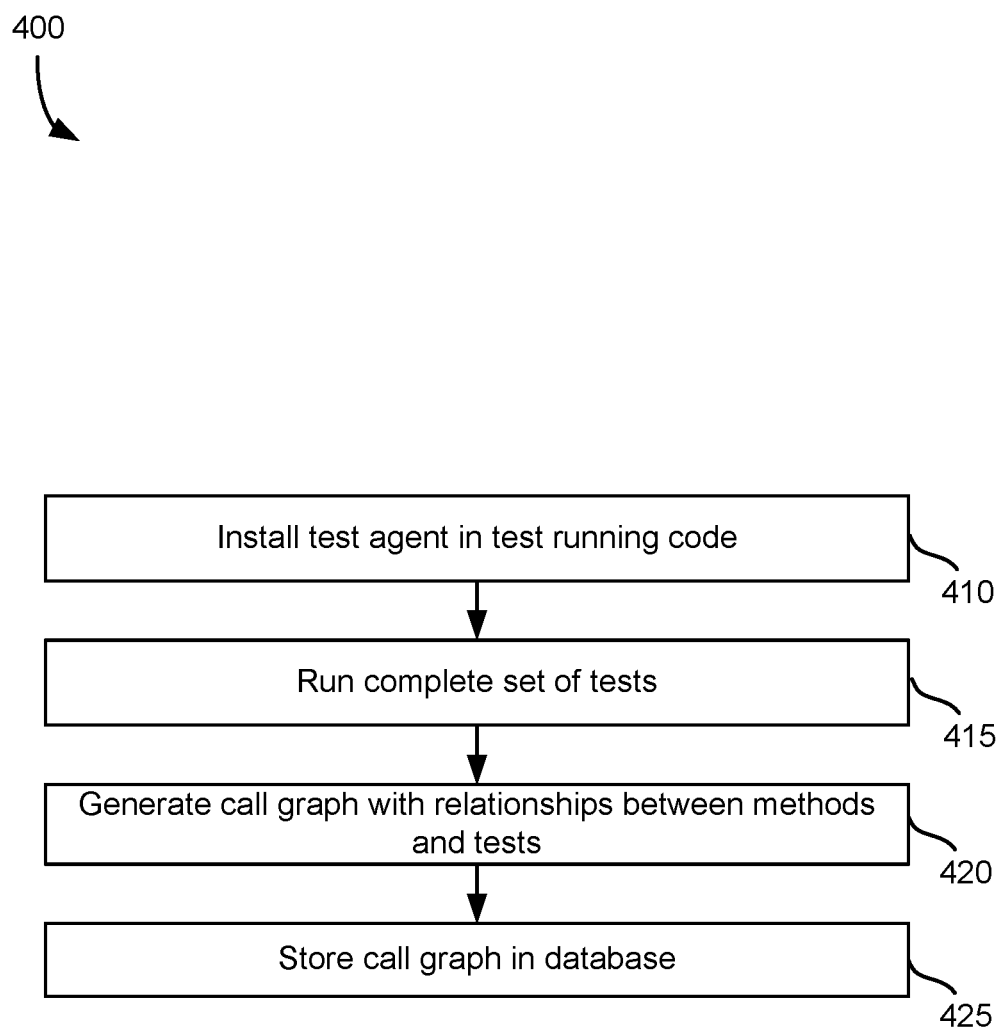
FIG. 4A is a method for bootstrapping a system that tests software.

FIG. 4A is a method for bootstrapping a system that tests software. First, a test agent is installed in testing software at step 410. The test agent may be installed in a portion of the testing software that performs a particular test, such as unit testing, in the software under development.

In some instances, the code to be tested is updated, or some other event occurs and is detected which triggers a test. A complete set of tests for the code may be executed at step 415.

A call graph may be generated with relationships between methods and tests at step 420. Generating a call graph may include detecting properties for the methods in the code. Detecting the properties may include retrieving method class information by an intelligence server based on files associated with the updated code. Detecting properties for methods within code being tested is discussed in more detail with respect to method 500 of FIG. 5.

The call graph may be generated by the intelligence server and stored with the method class information by the intelligence server. The call graph may be stored on the intelligence server, a data store, or both, at step 425.

Figure 4B:
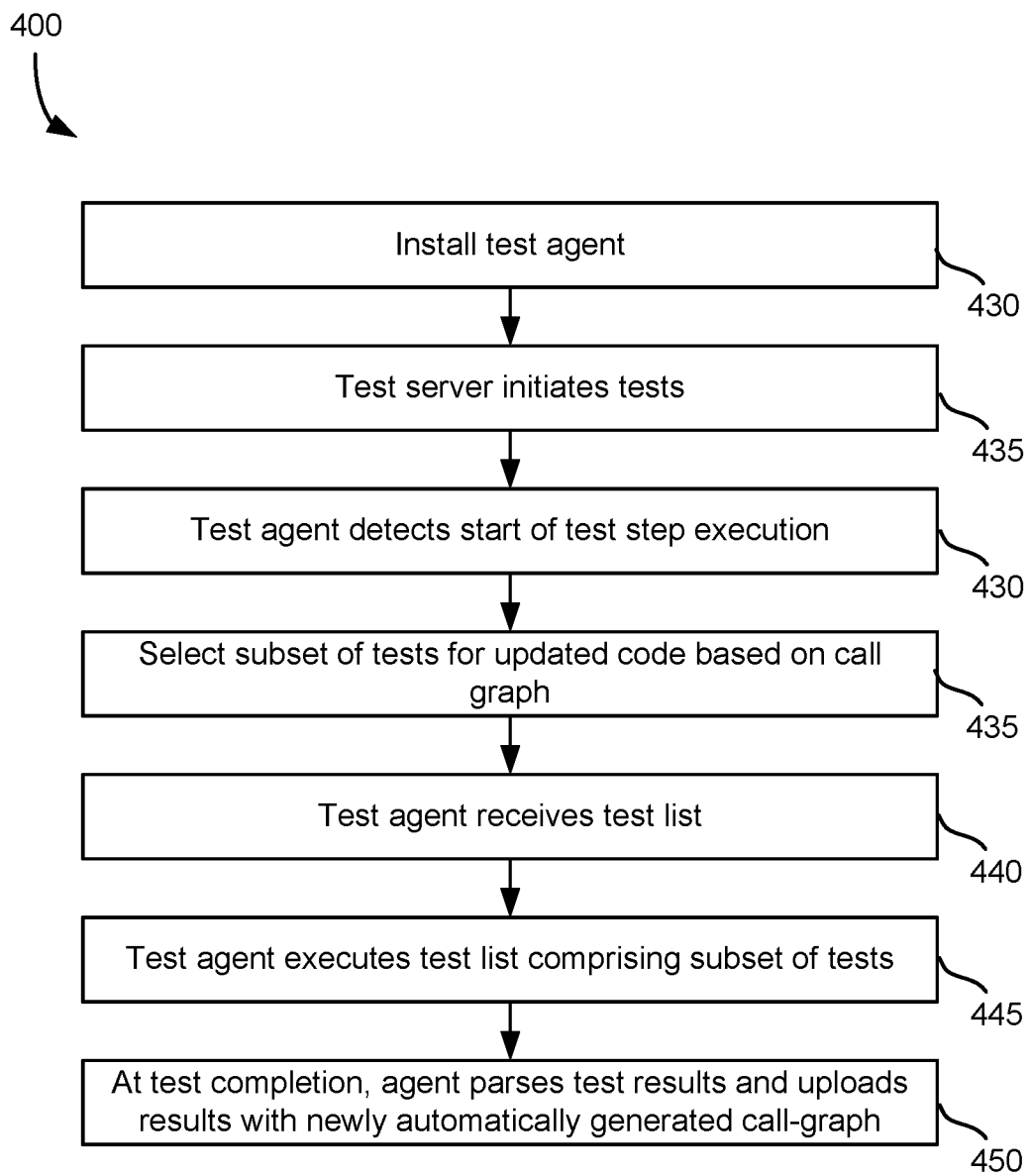
FIG. 4B is a method for testing software.

FIG. 4B is a method for testing software. A test agent is installed in a testing environment at step 430. A test server initiates tests at step 435. The agent may detect the start of a particular step in the test at step 430.

A subset of tests is then selected for the updated code based on the call graph generated by the intelligence server at step 435. Selecting a subset of tests may include accessing files associated by the changed code, parsing the received files to identify method classes associated with those files, and generating a test list from the received method classes using a call graph. Selecting a subset of tests for an updated code based on the call graph is discussed in more detail with respect to the method of FIG. 6.

A test agent receives a test list created by an intelligence server at step 440. The test list is generated by the intelligence server, which uses the call graph to select tests from a comprehensive test plan. The test list includes a subset of tests from the test plan that would normally be performed on the software under test. The subset of tests only includes tests for methods that were changed and tests that have changed or added.

The test agent executes the test list comprising the subset of tests at step 445. In some instances, a test agent executes the test list with instrumentation on. This allows data to be collected during the tests.

At test completion, the testing agent accesses and parses the test results and uploads the results with an automatically generated call graph at step 450. Parsing the test results may include looking for new methods as well as results of previous tests. The results may be uploaded to the intelligence server and include all or a new portion of a call graph or new information from which the intelligence server may generate a call graph. The intelligence server may then take the automatically generated call graph portion and place it within the appropriate position within a master call graph. The call graph is then updated, whether it is stored locally at the intelligence server or remotely on the data store.

Figure 5:
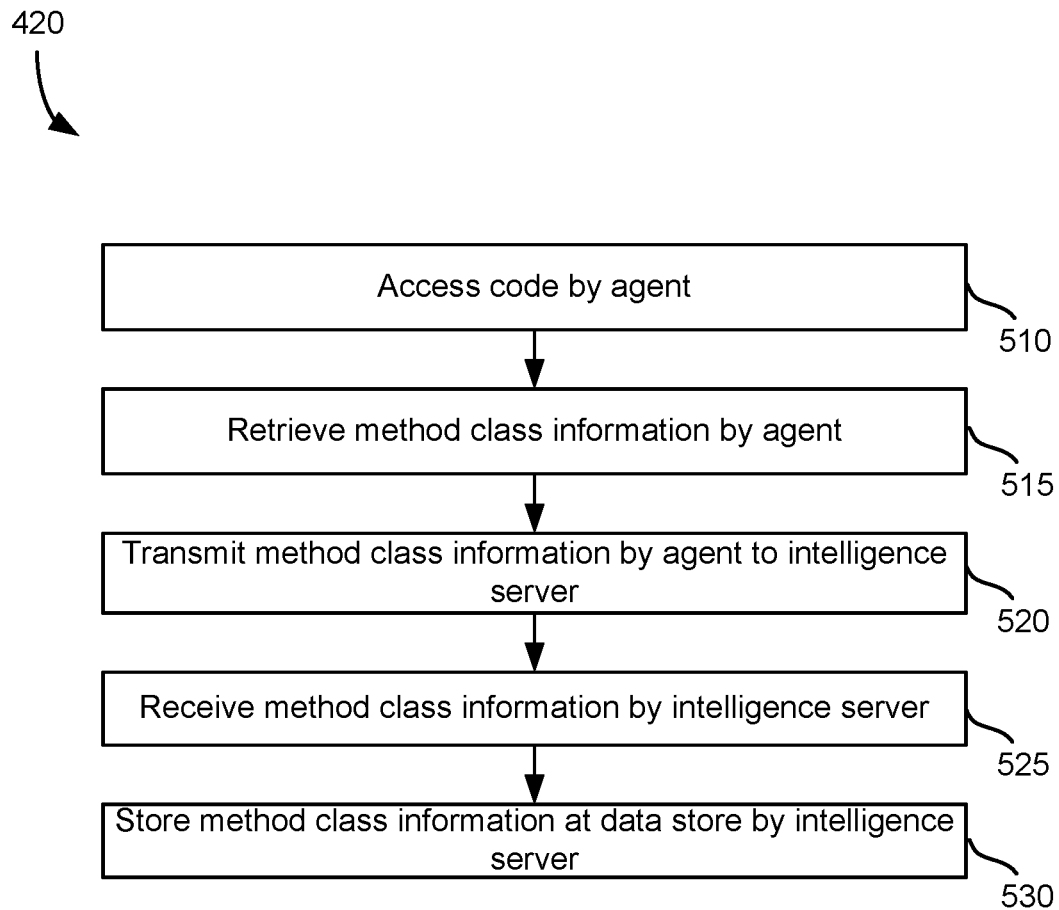
FIG. 5 is a method for detecting properties for code method classes.

FIG. 5 is a method for detecting properties for code method classes. The method of FIG. 5 provides more detail for step 420 of the method of FIG. 4. First, the code to be tested is accessed by an agent on the testing server at step 510. Method class information is retrieved by the agent at step 515. The method class information may be retrieved in the form of one or more files associated with changes made to the software under test. The method class information, for example the files for the changes made to the code, are then transmitted by the agent to an intelligence server at step 520. The method class information is received by an intelligence server from the testing agent at step 525. The method class information is then stored either locally or at a data store by the intelligence server at step 530.

Figure 6:
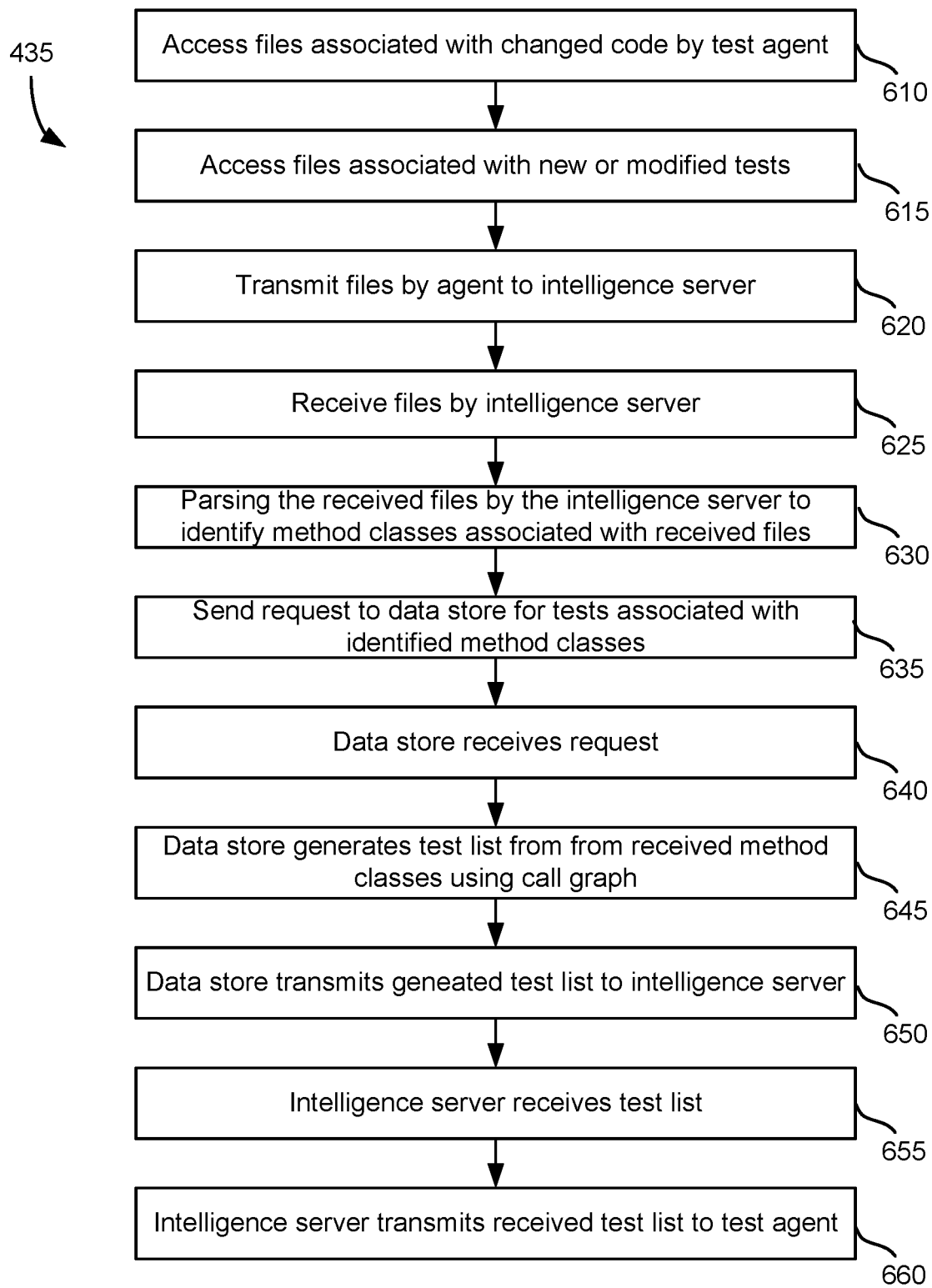
FIG. 6 is a method for generating subsets of tests for updated code based on a call graph.

FIG. 6 is a method for selecting subsets of tests for updated code based on a call graph. The method of FIG. 6 provides more detail for step 435 the method of FIG. 4B. The method of FIG. 6 begins with accessing files associated with changed code by a test agent at step 610. Files associated with a new or modified test are accessed at step 615. The accessed files are then transmitted by the agent to the intelligence server at step 620. The files are received by the intelligence server at step 625, and the intelligence server parses the received files at step 630. The intelligence server parses the received files to identify method classes associated with the received files.

A request is then sent to the data store for tests associated with the identified method classes at step 635. The request is sent by the intelligence server to the data store. The data store receives a request at step 640, and generates a test list from the received method classes using a call graph stored at the data store at step 645. To generate the test list, the data store receives the request, identifies the methods in the request, and then retrieves the tests that correspond to the listed methods. In this manner, not all tests for a particular test plan need to be performed when a change is made. Rather, only the most important tests and most relevant tests shall be performed in response to detecting the change.

The data store transmits the generated test list to the intelligence server at step 650. The intelligence server receives the test list at step 655, and transmits the received test list back to the test agent at step 660.

Figure 7:
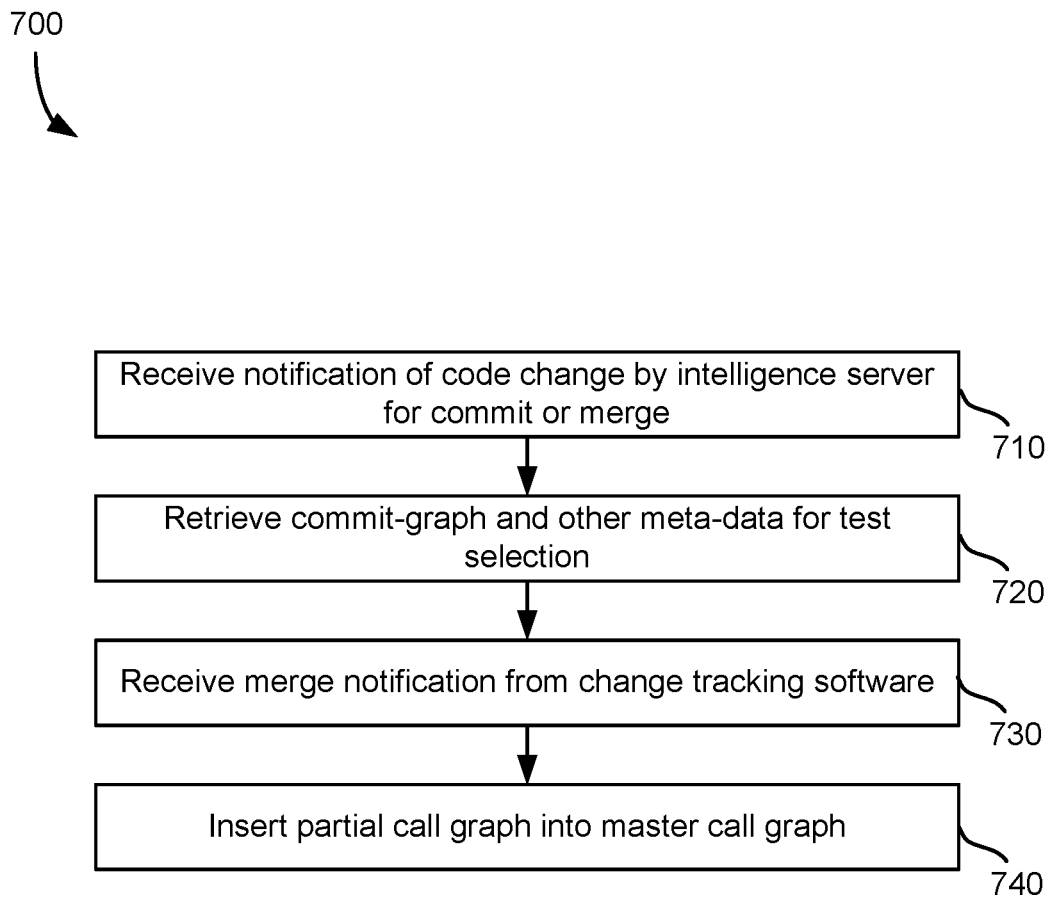
FIG. 7 is a method for updating a master call graph.

FIG. 7 is a method for updating a master call graph. First, a notification can be received of a code change at step 710. The notification may be for a commit or merge operation and may be received by the intelligence server from the test agent at step 710. A commit graph and other metadata are retrieved for the test selection at step 720. A merge notification is received from change tracking software at step 730. In some instances, the change tracking software may be GIT or other appropriate software. A partial call graph may then be inserted into a master call graph at step 740.

Figure 8:
FIG. 8 is a table of a full set of methods and corresponding tests.

FIG. 8 is a table of a full set of methods and corresponding tests. Table 800 of FIG. 8 lists methods M1 through M 18. Each method may be included in a particular unit or block of software to be tested. For each method, one or more test is listed that should be performed for that particular method. For example, method M1 is associated with tests T1 and T2, method M2 is associated with test T3, and method M3 is associated with test T4. In typical systems, when there is a change detected in the software unit or block of software, the default test plan would include all the tests for methods M1-M18.

Figure 9:
FIG. 9 is a table of a subset of methods and corresponding tests.

FIG. 9 is a table of a subset of methods and their corresponding tests. The subset of methods in table 900 corresponds to methods that have been detected to have changed or are associated with new or modified tests. The subset of methods illustrated in table 900 includes M2, M3, M4, M 11, M 12, M 13, M 17, and M 18. To identify the subset of methods, a list of methods that has been updated is transferred from the test agent to the intelligence server. The test agent may obtain one for more files associated with of updated method classes and transmit the files to the intelligence server. The agent may identify the files using a change tracking mechanism, which may be part of the agent or a separate software tool. The files are received by the intelligence server, and the intelligence server generates a list of methods from the files. In some instances, the list of methods includes methods listed in the files. The method list is then provided to the data store in which the call graph is stored. The data store then performs a search tests that are related to the methods, based on the relationships listed in the call graphs. The list of tests is then returned to the intelligence server. The result is a subset of tests, which comprise fewer than all of the tests in a test plan that would otherwise be performed in response to a change in the software under test.

Figure 10:
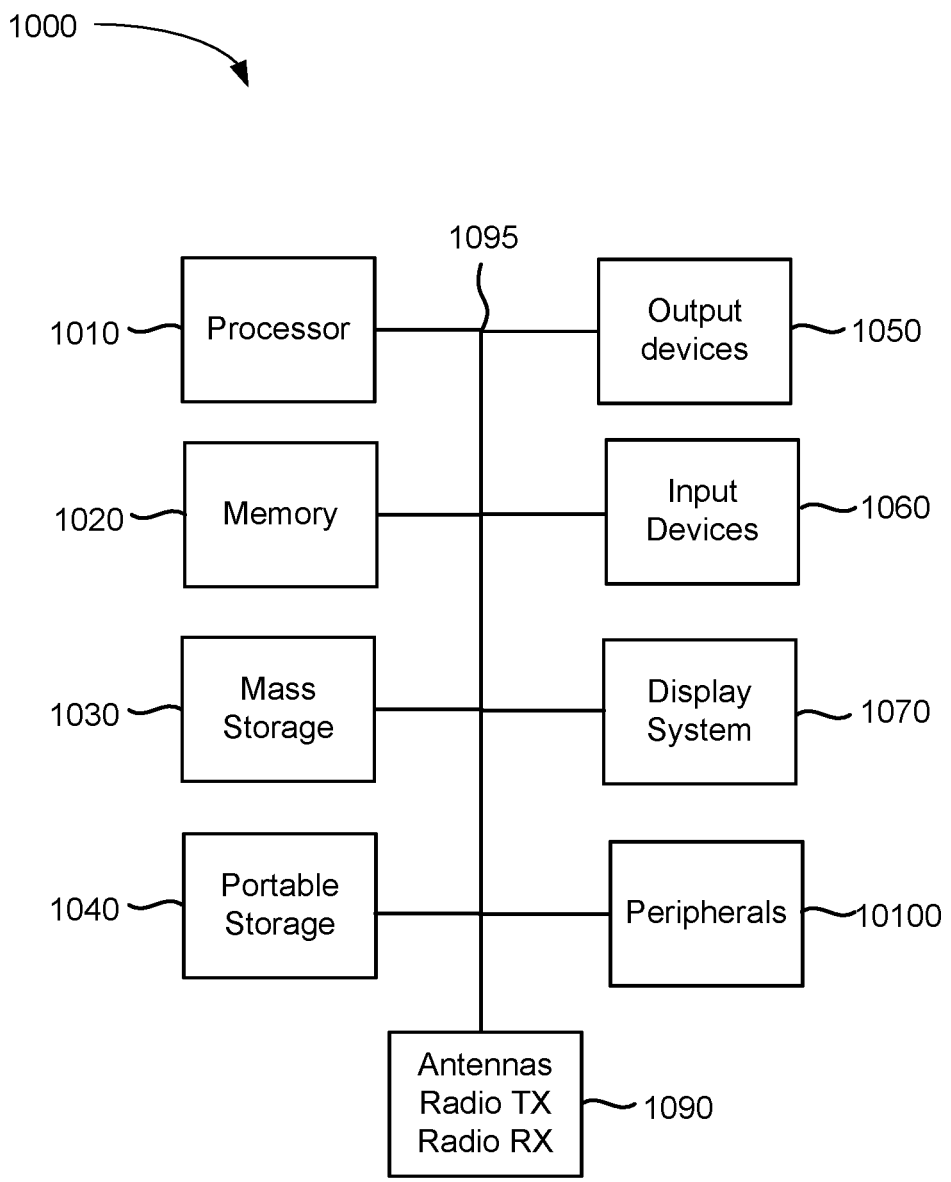
FIG. 10 is a block diagram of a computing environment for implementing the present technology.

FIG. 10 is a block diagram of a system for implementing machines that implement the present technology. System 1000 of FIG. 10 may be implemented in the contexts of the likes of machines that implement testing server 110, intelligence server 150, and data store 160. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive, an optical disk drive, a flash drive, or other device, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, USB drive, memory card or stick, or other portable or removable memory, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information and processes the information for output to the display device. Display system 1070 may also receive input as a touch-screen.

Peripherals 1080 may include any type of computer support device to add additional functionality to the computer system. For example, peripheral device(s) 1080 may include a modem or a router, printer, and other device.

The system of 1000 may also include, in some implementations, antennas, radio transmitters and radio receivers 1090. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically testing software code, comprising:

detecting a test event initiated by a testing program and associated with testing a first software at a testing server, the test event detected by an agent that is separate from and in communication with the testing program at the testing server, the test event associated with a plurality of tests generated by the testing program for the first software;

accessing one or more files associated with changed code by the agent, the changed code within the first software;

accessing one or more files associated with new or modified tests by the agent, the new or modified tests to be applied to the first software;

transmitting, by the agent on the testing server to a remote server, the accessed files associated with the changed code and the new or modified tests, the accessed files associated with a subset of the first software to be tested, the one or more files including information indicating a subset of the testing program that has changed;

receiving, by the agent on the testing server from the remote server, a list of tests to be performed in response to the test event, the received list of tests being a subset of the plurality of tests and generated at least in part from a first call graph; and executing the tests in the list of tests by the agent in the testing server.

2. The method of claim 1, wherein the first call graph includes relationships between the plurality of tests and portions of the first software.

3. The method of claim 2, wherein the portions of the first software are method classes.

4. The method of claim 1, further comprising:
parsing test results in response to execution of the tests; and
transmitting the test results by the agent to the remote server, the test results including a partial call graph to be automatically uploaded into the first call graph.

5. The method of claim 1, wherein the call graph is generated automatically by the remote server.

6. The method of claim 1, wherein the call graph specifies one or more tests to be executed for each method in the software, and wherein each of the one or more files specifies one or more methods.

7. The method of claim 1, wherein the duration of execution of the subset of tests in the test list is shorter than the duration of execution of the plurality of tests.

8. A non-transitory computer readable storage medium having embodied thereon a program, the program being executable by a processor to perform a method for automatically testing software code, the method comprising:
detecting a test event initiated by a testing program and associated with testing a first software at a testing server, the test event detected by an agent that is separate from and in communication with the testing program at the testing server, the testing event associated with a plurality of tests generated by the testing program for the first software;
accessing one or more files associated with changed code by the agent, the changed code within the first software;
accessing one or more files associated with new or modified tests by the agent, the new or modified tests to be applied to the first software;
transmitting, by the agent on the testing server to a remote server, the accessed files associated with the changed code and the new or modified tests, the accessed files associated with a subset of the first software to be tested, the one or more files including information indicating a subset of the testing program that has changed;
receiving, by the agent on the testing server from the remote server, a list of tests to be performed in response to the test event, the received list of tests being a subset of the plurality of tests and generated at least in part from a first call graph; and
executing the tests in the list of tests by the agent in the testing server.

9. A system for automatically testing software code, comprising:
a server including a memory and a processor; and
one or more modules stored in the memory and executed by the processor to detect a test event initiated by a testing program and associated with testing a first software at a testing server, the test event detected by an agent that is separate from and in communication with the testing program at the testing server, the test event associated with a plurality of tests generated by the testing program for the first software, access one or more files associated with changed code by the agent, the changed code within the first software, access one or more files associated with new or modified tests by the agent, the new or modified tests to be applied to the first software, transmit, by the agent on the testing server to a remote server, the accessed files associated with the changed code and the new or modified tests, the accessed files associated with a subset of the first software to be tested, the one or more files including information indicating a subset of the testing program that has changed, receive, by the agent on the testing server from the remote server, a list of tests to be performed in response to the test event, the received list of tests being a subset of the plurality of tests and generated at least in part from a first call graph, and execute the tests in the list of tests by the agent in the testing server.

10. A method for automatically testing software code, comprising:
receiving, by a remote server, a message from an agent executing within a testing program at a testing server, the message including one or more files associated with a code change notification and associated with a test event initiated at the testing server, the test event associated with a first software to be tested at the testing server;
parsing the one or more files by the remote server to identify portions of the first software to test;
identifying a plurality of tests to perform by the testing server based on the identified software portions and a master call graph, the plurality of tests representing tests associated with the code change notification and being less than the tests associated with the entire master call graph;
inserting a partial call graph into the master call graph, the partial call graph generated based at least in part on the one or more files associated with a code change notification; and
transmitting, by the remote server, the plurality of tests to perform at the testing server.

11. The method of claim 10, wherein the message is initiated by the agent based on a test-execution event.

12. The method of claim 10, wherein the call graph specifies one or more tests to be executed for each method in the software, and wherein each of the one or more files specifies one or more methods.

13. The method of claim 10, wherein the call graph is retrieved by the remote server from a data store.

14. A non-transitory computer readable storage medium having embodied thereon a program, the program being executable by a processor to perform a method for automatically testing software code, the method comprising:
receiving, by a remote server, a message from an agent executing within a testing program at a testing server, the message including one or more files associated with a code change notification and associated with a test event initiated at the testing server, the test event associated with a first software to be tested at the testing server;
parsing the one or more files by the remote server to identify portions of the first software to test;
identifying a plurality of tests to perform by the testing server based on the identified software portions and a master call graph, the plurality of tests representing tests associated with the code change notification and being less than the tests associated with the entire master call graph;
inserting a partial call graph into the master call graph, the partial call graph generated based at least in part on the one or more files associated with a code change notification; and
transmitting, by the remote server, the plurality of tests to perform at the testing server.

15. A system for automatically testing software code, comprising:

a server including a memory and a processor; and
one or more modules stored in the memory and executed by the processor to receive, by a remote server, a message from an agent executing within a testing program at a testing server, the message including one or more files associated with a code change notification and associated with a test event initiated at the testing server, the test event associated with a first software to be tested at the testing server, parse the one or more files by the remote server to identify portions of the first software to test, identify a plurality of tests to perform by the testing server based on the identified software portions and a master call graph, the plurality of tests representing tests associated with the code change notification and being less than the tests associated with the entire master call graph, insert a partial call graph into the master call graph, the partial call graph generated based at least in part on the one or more files associated with a code change notification, and transmit, by the remote server, the plurality of tests to perform at the testing server.

16. The system of claim 15, wherein the first call graph includes relationships between the plurality of tests and portions of the first software.

17. The system of claim 16, wherein the portions of the first software are method classes.

18. The system of claim 15, the modules further executable to:

parse test results in response to execution of the tests; and
transmit the test results by the agent to the remote server, the test results including a partial call graph to be automatically uploaded into the first call graph.

19. The system of claim 15, wherein the call graph is generated automatically by the remote server.

20. The system of claim 15, wherein the call graph specifies one or more tests to be executed for each method in the software, and wherein each of the one or more files specifies one or more methods.

* * * * *